United States Patent
Bille

(10) Patent No.: US 8,020,994 B2
(45) Date of Patent: Sep. 20, 2011

(54) CUSTOM PHASE PLATE

(75) Inventor: Josef F. Bille, Heidelberg (DE)

(73) Assignee: Heidelberg Engineering GmbH, Heidelberg (DE)

( * ) Notice: Subject to any disclaimer, the term of this patent is extended or adjusted under 35 U.S.C. 154(b) by 423 days.

(21) Appl. No.: 12/204,674

(22) Filed: Sep. 4, 2008

(65) Prior Publication Data

US 2010/0053552 A1    Mar. 4, 2010

(51) Int. Cl.
A61B 3/10 (2006.01)
A61B 3/00 (2006.01)

(52) U.S. Cl. ........... 351/205; 351/200; 351/245

(58) Field of Classification Search ........ 351/200, 351/205, 245–246
See application file for complete search history.

(56) References Cited

U.S. PATENT DOCUMENTS

| | | | |
|---|---|---|---|
| 4,579,430 A | 4/1986 | Bille | |
| 5,062,702 A | 11/1991 | Bille | |
| 5,949,521 A | 9/1999 | Williams et al. | |
| 6,002,484 A | 12/1999 | Rozema et al. | |
| 6,220,707 B1 | 4/2001 | Bille | |
| 6,325,510 B1 | 12/2001 | Golub et al. | |
| 6,428,533 B1 | 8/2002 | Bille | |
| 6,717,104 B2 | 4/2004 | Thompson, Jr. et al. | |
| 2003/0143391 A1 | 7/2003 | Lai | |
| 2004/0260275 A1* | 12/2004 | Liang et al. | 606/5 |
| 2007/0258046 A1* | 11/2007 | Lai | 351/222 |

FOREIGN PATENT DOCUMENTS

EP    1234655 A1    8/2002
WO    2008002796 A2    1/2008

OTHER PUBLICATIONS

Gattass et al., Femtosecond laser micromachining in transparent materials, Nature Photonics, vol. 2, Apr. 2008.

* cited by examiner

Primary Examiner — Dawayne Pinkney
(74) Attorney, Agent, or Firm — Nydegger & Associates

(57) ABSTRACT

A custom phase plate for a light beam of wavelength "$\lambda$" includes a sheet of plastic material having a base refractive index "$n_o$". Formed onto a surface of the sheet is a plurality of contiguous spots having different refractive indices. Together, the spots establish a diffraction pattern in a light beam that removes optical aberrations from the beam. Specifically, each spot has a selected Optical Path Difference (OPD) relative to the base index ($n_o$) that is equal to $k\lambda/10$ (for k=1 to 10). Further, the OPD for each spot in the pattern is individually established by heating the plastic material with a laser beam of ultra-short pulses.

20 Claims, 1 Drawing Sheet

CUSTOM PHASE PLATE

FIELD OF THE INVENTION

The present invention pertains generally to devices and methods for use with ophthalmic diagnostic systems. More particularly, the present invention pertains to devices and methods for removing optical aberrations from a light beam, to thereby establish an essentially aberration-free convergence for the light beam. The present invention is particularly, but not exclusively, useful as a custom phase plate formed with a pattern of different refractive indices that creates diffractive conditions in a light beam for removal of optical aberrations from the beam.

BACKGROUND OF THE INVENTION

The efficacy of an ophthalmic laser scanning imaging system is very much dependent on the ability of a laser system to establish an effective spot size for its laser beam. To do this, it is very desirable that the system's laser beam converge to a diffraction limited focal spot (i.e. a Diffraction Limited Point Spread Function: DL-PSF). An important aspect for achieving this desired result is that the laser beam will have a substantially flat wavefront. Aberrations that distort the beam's wavefront, however, are frequently (i.e. almost always) introduced into the laser beam. The consequence here is that a distorted wavefront is introduced into the laser beam that, if not corrected, is detrimental to an optimization of the DL-PSF.

For ophthalmic imaging procedures, it happens that the eye itself frequently introduces significant optical and phase aberrations. Specifically, the cornea, the lens and the retina of an eye can each contribute to the introduced aberrations. As indicated above, for an optimal DL-PSF, these aberrations need to either be removed or, at least, minimized.

Using a wavefront analyzer (e.g. a Hartmann-Shack sensor) the total effect of aberrations that may be introduced into a light beam can be measured. The resultant measurements can then be used to create, or to program, devices that will compensate for the introduced aberrations. In each case, the objective is to reconstitute a light beam (e.g. diagnostic light beam of a laser scanning ophthalmoscope) with a substantially flat wavefront. Stated differently, distortions of a wavefront that result from external influences (i.e. the eye) need to be removed by counter-distortions. As mentioned above, this objective (i.e. a resultant flat wavefront) is important for establishing a DL-PSF that will improve the overall efficacy of a resolution and contrast of a laser scanning ophthalmoscope.

It is a well known physical phenomenon that light will be refracted when a wave crosses a boundary between two media in which its phase velocity differs. A consequence of this is an Optical Path Difference (OPD) that corresponds to a phase change in the light beam. Further, the extent of this phase change depends on the distance light travels through a medium. For instance, in a material (e.g. plastic) having a change in refractive index equal to 0.01 (i.e. $\Delta n=0.01$), the OPD for light traveling through five microns of the material will be approximately one-tenth of the light's wavelength (OPD=$\lambda/10$). The total effect, however, is distance dependent. For example, light traveling through twenty microns of material will have an OPD of $0.4\lambda$. Accordingly, there will be a complete 360° phase shift in $\lambda$ every fifty microns.

It is also well known that a plastic material can be optically altered by radiation from a femto-second laser beam, with consequent results in OPD as described above. Specifically, it can be shown that a single burst of a femto-second laser beam (e.g. pulses generated at 50 MHz for 100 femto-seconds) focused to a spot in the plastic material, will alter the material through a depth of about five microns. And, this alteration will result in an OPD of around $\lambda/10$. Furthermore, for a "k" number of aligned bursts, the OPD will equal approximately $k\lambda/10$. Depending on how the spots are arranged, various OPDs can be combined to affect the wavefront of a light beam in a predetermined manner. Thus, as implied above, when selected refraction changes are introduced into a light beam having a distorted wavefront, the result can be a return of the wavefront to a "flat" or "plane" configuration.

In light of the above, it is an object of the present invention to provide a system and method for removing aberrations from a light beam to improve convergence for an improved Diffraction Limited Point Spread Function. Another object of the present invention is to provide a phase plate for use in a retinal imaging system that is customized for the particular patient. Still another object of the present invention is to provide a customized phase plate that effectively compensates for static aberrations that are introduced into a light beam by the patient's eye. Yet another object of the present invention is to provide a customized phase plate for use with an ophthalmic laser system that is easy to use, is simple to manufacture and is relatively cost effective.

SUMMARY OF THE INVENTION

In accordance with the present invention a custom phase plate is manufactured using a laser unit that generates a pulsed laser beam. More specifically, the laser unit generates laser beam pulses at 50 MHz, with each pulse having a duration of about 100 femto-seconds and an energy level of about one nanojoule. As envisioned for the present invention, the focal spot of the laser beam is moved over a surface of plastic material having a refractive index "$n_o$". This is done to alter the surface by creating a pattern of changes in the refractive index of the material ($\Delta n$).

Preferably, the custom phase plate of the present invention is made from a flat sheet of plastic that has a first side and a second side, and it has a thickness of about 1 mm between the two sides. During the manufacture of the phase plate, however, the laser unit alters a surface layer having a depth of only about 50 microns. Optically, the purpose of the layer of altered material in the phase plate is to pre-compensate for optical aberrations. Specifically, this compensation is made to remove optical aberrations that will be subsequently introduced into a light beam by an optical system (e.g. an eye). Ultimately, the object here is to establish aberration-free convergence for a light wave after it has passed through the system.

For an ophthalmic application of the present invention, wavefront measurements are initially taken of an eye. As is well known, such wavefront measurements identify optical characteristics of the eye that are indicative of optical aberrations that are introduced into a light beam as light passes through the eye. Importantly, these wavefront measurements can be used to determine refractive index patterns that are required to remove optical aberrations from the light beam. Consequently, with the aberrations removed, a light beam passing through the eye will then converge to a diffraction limited focal spot (i.e. a Diffraction Limited Point Spread Function DL-PSF). Further, it happens that these wavefront measurements include all orders of aberrations that will be introduced by the eye. Accordingly, when an input light beam has only one wavelength (e.g. red light: $\lambda_r$=780 nm), a single custom diffraction plate is able to effectively compensate for all optical aberrations that might be introduced.

For the present invention, the pattern of refractive index changes that is created over a surface of a plastic sheet results from heating the plastic material in a predetermined manner. In particular, this heating is done by sequentially focusing a laser beam onto a plethora of contiguous spots in the material. The result at each spot is an Optical Path Difference (OPD) for light passing through the spot. Specifically, as envisioned for the present invention; for a given material (e.g. plastic), having a given change in refractive index ($\Delta n$) (e.g. $\Delta n$=0.01), and for a given distance through the material (e.g. 5 microns), an OPD (i.e. phase change) for light of a wavelength ($\lambda$) can be established. In particular, an OPD of $\lambda$/10 can be established for each 5 microns of spot depth. Thus, depending on the required diffraction for each spot, the spot depth will be between 5 and 50 microns.

In accordance with the present invention, each spot is created with the laser unit using a predetermined number of laser bursts (i.e. a "k" number of bursts). Preferably, each burst will include approximately 50 pulses and will be approximately 1 micro-second in duration. During each burst, an alteration of a substantially cylindrical volume of material occurs through a depth of approximately five microns with a diameter of about one micron. In general, as mentioned above, each burst will cause an OPD of about one-tenth of a wavelength ($\lambda$/10). For "k" bursts: OPD=k$\lambda$/10. Preferably, for the present invention there will be approximately a $\lambda$/10 change for every 5 microns of spot depth (i.e. "k" is in a range of 1 to 10). For example, consider a situation wherein it is desired to create an OPD of 0.4$\lambda$. In this case the laser unit is focused for an initial burst at a depth of twenty microns (i.e. k=4). Thereafter, the laser unit is refocused onto the spot three more times, with the focal point of the laser beam being withdrawn each time through a distance of five microns for each subsequent burst. As implied above, the number "k" is selected depending on the amount of diffraction that is desired at the spot (e.g. 0.2$\lambda$ for k=2; and 0.7$\lambda$ for k=7). As will be appreciated by the skilled artisan, the spot can be created by advancing, rather than withdrawing, the focal point of the laser beam.

For another aspect of the present invention, in addition to the diffractive changes that are imposed on a light beam by the custom phase plate, localized areas of refractive corrections can also be created if need be. Specifically, it may happen that specified areas in the vision plane of an eye are identified by the wavefront measurements that are more effectively corrected by refractive techniques. If so, the custom phase plate can be created to accommodate this requirement by superposing appropriate localized refractive area corrections (i.e. additional refractive index changes) to the previously determined pattern of refractive index changes that rely on diffraction techniques.

Additionally, by using the wavefront analysis mentioned above to determine the configuration of the fundus of the eye, focus/defocus compensation can be added to the custom phase plate. Specifically, this can be done to account for myopic/hyperopic aberrations. In any event, the diffraction (change of refractive index) requirements that are necessary to compensate for optical aberrations introduced by the eye are additive. Thus, as also mentioned above, only one custom phase plate is required whenever input light of a single wavelength is used for imaging purposes. And, this will be so, regardless of the wavelength(s) of the return light beam that radiates from the fundus.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
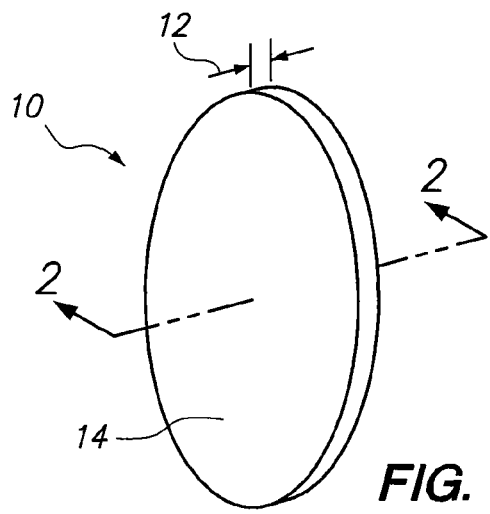
FIG. 1 is a perspective view of a customized phase plate in accordance with the present invention.
Figure 2:
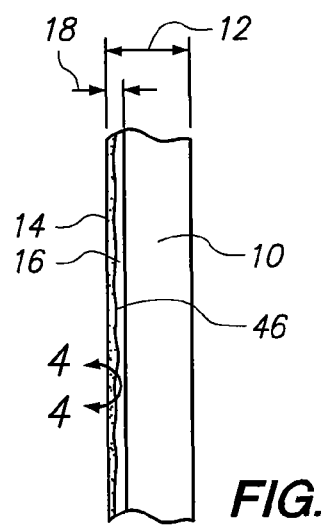
FIG. 2 is a cross section view of the phase plate as seen along the line 2-2 in FIG. 1.

Referring initially to FIG. 1, a customized phase plate in accordance with the present invention is shown and is generally designated 10. As shown, the phase plate 10 has a thickness 12 and a substantially flat surface 14. Preferably, the phase plate 10 is made of a clear, transparent plastic material having a base refractive index "$n_o$", and the thickness 12 of the phase plate 10 is approximately one millimeter. As best appreciated with reference to FIG. 2, the surface 14 is formed with a layer 16 having a depth 18. In light of the disclosure below, the depth 18 of the layer 16 will be approximately fifty microns.

Figure 3:
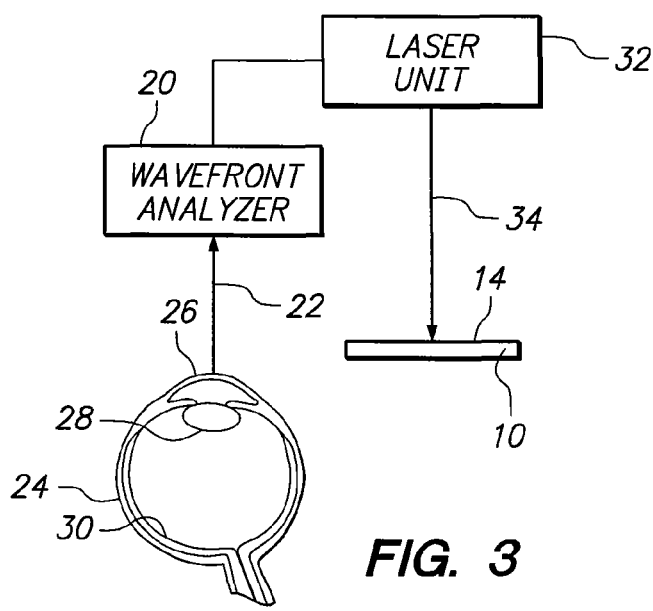
FIG. 3 is a schematic drawing of components used for the manufacture of a phase plate in accordance with the present invention.

Manufacture of the layer 16 of phase plate 10 will be best described with reference to FIG. 3. There it will be seen that a wavefront analyzer 20 is positioned to receive the light 22 that is reflected from inside the eye 24 of a patient (not shown). For purposes of the present invention, the wavefront analyzer 20 is preferably a Hartmann-Shack type wavefront sensor. In any event, the reflected light 22 will have passed through the cornea 26, the lens 28 and portions of the retina 30 of the eye 24 before being received by the wavefront analyzer 20. In the wavefront analyzer 20, the reflected light 22 is evaluated in order to measure the aberrations (optical and phase aberrations) that have been introduced into the light beam 22 by anatomical components of the eye 24 (i.e. cornea 26, lens 28 and retina 30). This information is then passed to a laser unit 32 for controlling a manufacturing beam 34 that will be used to make the customized phase plate 10.

Figure 4:
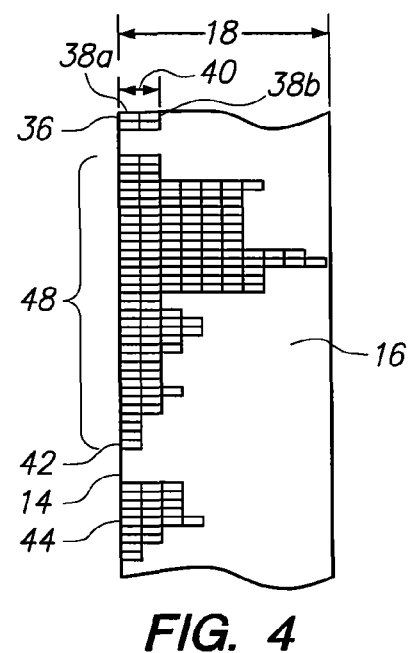
FIG. 4 is an enlarged view of a portion of the phase plate cross section as generally seen in an area identified by the line 4-4 in FIG. 2.

For purposes of the present invention, the manufacturing beam 34 is preferably a pulsed femto-second laser beam. Preferably, the beam 34 includes pulses generated at a rate of around 50 MHz, with an energy level of about 1 nJ per pulse. Bursts of these pulses are then used to create specified spots in the layer 16 of phase plate 10. The spot 36 shown in FIG. 4 is typical, but is only exemplary.

In detail, each spot (e.g. spot 36) is made by a series of bursts of laser pulses from the laser unit 32. For the phase plate 10, a spot can result from as few as zero and as many as ten such bursts. In each instance, a single burst of pulses will alter a volume of material in the layer 16 (i.e. a spot segment 38) that is about one micron in diameter and five microns deep. By way of example, the spot 36 was made with two bursts and, accordingly, includes a spot segment 38*a* and a spot segment 38*b*. Together, the spot segments 38*a* and 38*b* give the spot 36 an overall depth 40 that is equal to about ten microns. As indicated in FIG. 4, additional spots (e.g. spot 42 and spot 44) are manufactured across the surface 14 of the phase plate 10. These spots will be generally contiguous, and will be arranged in accordance with input from the wavefront analyzer 20 to create a diffraction pattern 46 (see FIG. 2) that is specific for each patient.

Optically, each spot (e.g. spot 36) in the diffraction pattern 46 will be made to have a predetermined Optical Path Difference (OPD). More specifically, each spot segment 38 (e.g. spot segment 38a in spot 36) contributes an OPD of $\lambda/10$ to the manufactured spot (e.g. spot 36). Stated differently, for a particular change in refractive index ($\Delta n$), and for a "k" number of bursts (k=1 to 10), the OPD will equal $\lambda/10$. Thus, depending on the number of spot segments 38 in a spot (i.e. number of bursts used for its manufacture) each spot has a predetermined OPD (e.g. three bursts generates an OPD=$3\lambda/10$). As indicated above, the resultant diffraction pattern 46 depends on input from the wavefront analyzer 20. Further, a localized area 48 can be included into the diffraction pattern 46 to accommodate asymmetric aberrations. To do this, additional spot segments 38 can be added, as required.

Figure 5:
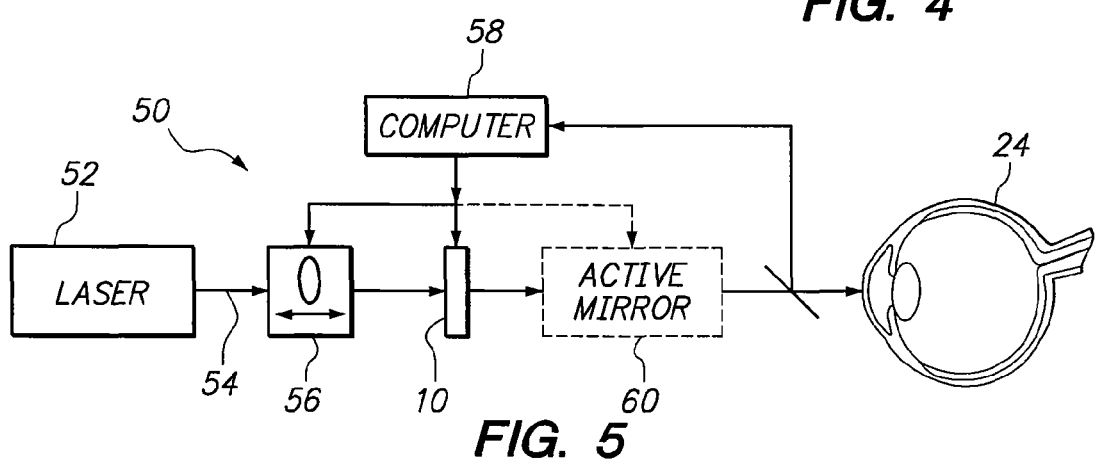
FIG. 5 is a schematic view of a phase plate positioned for use in an ophthalmic laser system.

FIG. 5 shows an exemplary scanning imaging system, generally designated 50, that includes a customized phase plate 10. Specifically, the system 50 includes a laser 52 for generating a laser beam 54. It also includes a focus/defocus unit 56 that together with the phase plate 10 can be used to remove aberrations from the beam 54. More specifically, a computer 58 can be incorporated as shown to provide feedback control for the operations of the focus/defocus unit 56 and the phase plate 10. In an alternate embodiment for the system 10, an active mirror 60 can also be used with the focus/defocus unit 56, and the phase plate 10, to remove aberrations from the laser beam 54. In this case, the active mirror 60 can be included as suggested by the dashed lines in FIG. 5.

While the particular Custom Phase Plate as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A custom phase plate for removing optical aberrations from a light beam having a wavelength "$\lambda$" which comprises:
a sheet of a clear transparent material having a surface, wherein the material has a base refractive index of "$n_o$"; and
a plurality of contiguous spots formed on the surface of the material by a laser unit responsive to a wavefront analyzer to establish a diffraction pattern based on optical aberrations in the light beam detected by the wavefront analyzer, wherein each spot has a selected Optical Path Difference (OPD) relative to the base index "$n_o$", OPD=$k\Delta n$=$k\lambda/10$, where k=1 to 10, and wherein the diffraction pattern removes predetermined optical aberrations detected by the wavefront analyzer from the light beam to create a substantially aberration-free convergence for the light beam passing through the phase plate.

2. A phase plate as recited in claim 1 wherein the change in refractive index "$\Delta n$" for each spot is a result of heating the spot with a laser beam generated by the laser unit.

3. A phase plate as recited in claim 2 wherein the laser beam includes pulses generated at 50 MHz, with each pulse having a duration of about 100 femto-seconds and an energy level of about 1 nJ.

4. A phase plate as recited in claim 3 wherein each spot is formed using a "k" number of sequential bursts from the laser beam, and wherein each burst includes about fifty pulses and is approximately of one micro-second duration.

5. A phase plate as recited in claim 4 wherein each burst alters a substantially cylindrical shaped volume of the material having about a one micron diameter and about a five micron depth.

6. A phase plate as recited in claim 1 wherein the sheet has a thickness of approximately 1 mm.

7. A phase plate as recited in claim 1 further comprising a localized refractive area formed on the surface, wherein the localized refractive area is characterized by additional changes in refractive indices and is additive to the diffraction pattern.

8. A custom phase plate for removing optical aberrations from a light beam having a wavelength "$\lambda$" which comprises:
a plurality of contiguous spots formed to establish a diffraction pattern in a layer of material based on optical aberations in the light beam detected by a wavefront analyzer, wherein the layer of material has a base refractive index "$n_o$", wherein each spot introduces a selected Optical Path Difference (OPD), relative to "$n_o$", and wherein the OPD is less than "$\lambda$"; and
a base member for supporting the layer of material while the layer is positioned across the path of the light beam to create a substantially aberration-free convergence for the light beam by using the diffraction pattern to remove optical aberrations therefrom.

9. A phase plate as recited in claim 8 wherein OPD=$k\lambda/10$, and wherein "k" is equal to an integer in the range of 1 to 10.

10. A phase plate as recited in claim 9 wherein the change in refractive index "$\Delta n$" for each spot is a result of heating the spot with a laser beam generated by the laser unit.

11. A phase plate as recited in claim 10 wherein the laser beam includes pulses generated at 50 MHz, with each pulse having a duration of about 100 femto-seconds and an energy level of about 1 nJ.

12. A phase plate as recited in claim 11 wherein each spot is formed using a "k" number of sequential bursts from the laser beam, and wherein each burst includes about fifty pulses and is approximately of one micro-second duration, and further wherein each burst alters a substantially cylindrical shaped volume of the material having about a one micron diameter and about a five micron depth.

13. A phase plate as recited in claim 8 wherein the base member is a sheet of clear transparent plastic having a first side and a second side with a thickness of approximately one millimeter therebetween, and wherein the layer is formed on the base member and has a variable thickness less than about 50 microns.

14. A phase plate as recited in claim 8 further comprising a localized refractive area formed on the surface, wherein the localized refractive area is characterized by additional changes in refractive indices and is additive to the diffraction pattern.

15. A system to compensate for optical aberrations introduced into a light beam having a wavelength "$\lambda$" which comprises:
a wavefront analyzer for measuring optical aberrations introduced into a light beam by an optical device;
a sheet of a clear transparent material having a surface and a base refractive index of "$n_o$"; and
a laser unit for individually heating a plurality of contiguous spots on the surface of the material to establish a diffraction pattern, wherein the laser unit receives information about optical aberrations in the light beam from the wavefront analyzer, wherein each spot has a selected Optical Path Difference (OPD), relative to the base index "$n_o$", wherein OPD is equal to $k\lambda/10$, where k=1 to 10, and wherein the diffraction pattern compensates for the optical aberrations measured by the wavefront analyzer to create a substantially aberration-free convergence for a light beam passing through the phase plate.

16. A system as recited in claim 15 wherein the optical device is an eye.

17. A system as recited in claim 15 wherein the change in OPD for each spot is a result of heating the spot with a laser beam generated by a laser unit having pulses generated at 50 MHz, with each pulse having a duration of about 100 femtoseconds and an energy level of about 1 nJ.

18. A system as recited in claim 17 wherein each spot is formed using a "k" number of sequential bursts from the laser beam, and wherein each burst includes about fifty pulses and is approximately of one micro-second duration, and further wherein each burst alters a substantially cylindrical shaped volume of the material having about a one micron diameter and about a five micron depth.

19. A system as recited in claim 15 wherein the sheet is made of clear transparent plastic having a first side and a second side with a thickness of approximately one millimeter therebetween.

20. A system as recited in claim 15 further comprising a localized refractive area formed on the surface, wherein the localized refractive area is characterized by additional changes in refractive indices and is additive to the diffraction pattern.

* * * * *